April 8, 1952          E. H. MUELLER          2,592,056

VALVE WITH ADJUSTABLE FLOW CONTROL

Filed Dec. 23, 1948          2 SHEETS—SHEET 1

INVENTOR.
Ervin H. Mueller
BY
Barnes, Kisselle, Laughlin & Raisch
ATTORNEYS.

April 8, 1952  E. H. MUELLER  2,592,056
VALVE WITH ADJUSTABLE FLOW CONTROL
Filed Dec. 23, 1948  2 SHEETS—SHEET 2

INVENTOR.
Ervin H. Mueller
BY
Barnes, Kisselle, Laughlin & Raisch
ATTORNEYS.

Patented Apr. 8, 1952

2,592,056

UNITED STATES PATENT OFFICE 2,592,056

VALVE WITH ADJUSTABLE FLOW CONTROL

Ervin H. Mueller, Grosse Pointe, Mich.

Application December 23, 1948, Serial No. 66,956

2 Claims. (Cl. 251—154)

1

This invention relates to an adjustable valve for controlling the flow of a fluid, such as gas, for supplying a gas burner.

In gas burning equipment such, for example, as a gas range, it is desirable to have the valve arranged so that the turnable member thereof may be manipulated to a set position and in this position the flow of gas is such as to provide a desired flame condition. The valve may be one which generally has two positions, one of which is a wide open position thus providing a high or full flame and another of which is a throttling position for a lesser flow of gas to thus obtain a low or simmering flame. The object of the present invention is to provide an improved construction wherein adjustments may be made on the valve from the exterior thereof in order to selectively position a stop for in turn limiting and setting the position of the turnable member.

In present day ranges the valves are well concealed by exterior sheet metal work of the range and it is an object of the invention to provide a construction which can be adjusted by the use of a tool or the like introduced to the valve in an axial direction. That is to say, the valve stem may pass out through an opening in the exterior sheet metal work and a suitable tool may be passed through the opening in general parallelism with the valve stem and the adjustments thus made.

The invention may be embodied in a valve wherein the adjustment is one which controls the simmer or low flame although the adjustment may be made to control or regulate the high flame and the valve shown in the accompanying drawings illustrates a construction where the adjustment controls the low or simmer flame.

Figure 1:
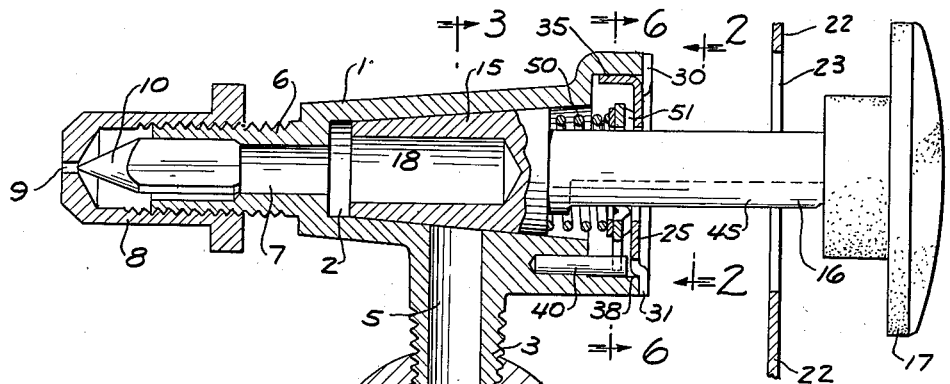
Fig. 1 is a cross sectional view taken through a valve constructed in accordance with the invention and it illustrates some of the exterior sheet metal work and the opening through which the stem extends.

In Fig. 1 the valve is shown as having a body

2

1 with a tapered valve chamber 2 therein, a threaded extension 3 for connection to a supply pipe 4, the extension having an inlet passage 5. The valve body has an extension 6 providing an outlet passage 7 and it may have the usual hood 8 with an outlet orifice 9 controllable by a needle member 10.

Figure 3:
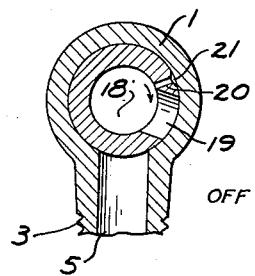
Fig. 3 is a sectional view taken on line 3—3 showing the ports in the valve and illustrating the same in "off" position.
Figure 4:
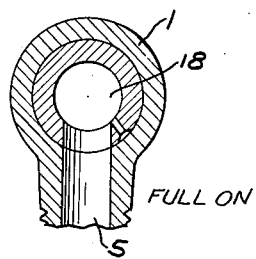
Fig. 4 is a sectional view similar to Fig. 3 showing the valve in full "on" position.
Figure 5:
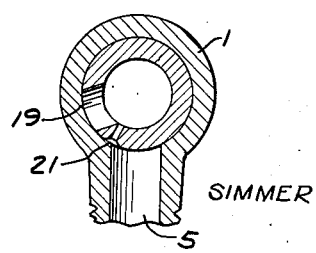
Fig. 5 is a view similar to Figs. 3 and 4 showing the valve in simmer position.

Mounted within the body is a tapered valve member 15 with a projecting stem 16 which may be provided with a suitable handle 17. The valve member has a central bore 18 and as shown in Figs. 3, 4 and 5, a port 19 and a smaller port 20, the inlet end of which is preferably enlarged as shown at 21. The valve is shown as positioned relative to exterior sheet metal work 22 of a range or the like having an opening 23 through which the stem extends, the opening being considerably larger than the stem 16.

It will be appreciated by considering Figs. 3, 4 and 5 that when the valve member 15 is rotatably positioned, as shown in Fig. 3, that no gas flows therethrough since the inlet passage 5 is closed and this is the "off" position. If the valve be turned clockwise as Fig. 3 is viewed, to the position shown in Fig. 4, the port 19 is in registry with the inlet passage 5 and this is the full "on" position. In this position the gas may pass through the port 19 into the passage 18 through the outlet passage 7 and through the orifice 9. If the valve be further rotated clockwise from the position shown in Fig. 4 to a position at or near that shown in Fig. 5, the incoming gas flows through the port 20.

In this position a small supply of gas flows through the valve and through the orifice 9 and only enough gas is supplied to support a small or simmering flame. The enlarged portion 21 of the port 20 is provided for accumulation of lubricant or other material to minimize the possibility of the small port 20 being clogged or filled with lubricant which is ordinarily used between the walls of the valve chamber 2 and the surfaces of the tapered valve member 15.

Figure 2:
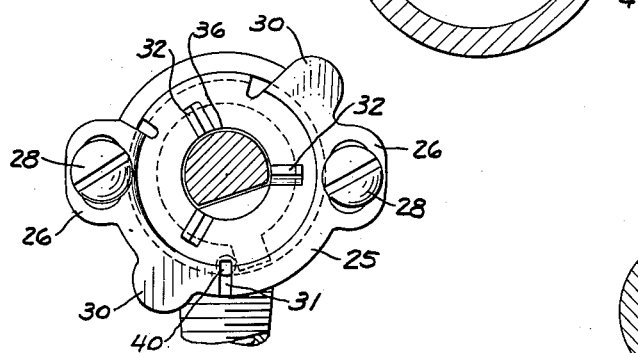
Fig. 2 is a cross sectional view taken on line 2—2 of Fig. 1 showing the valve cap.
Figure 10:
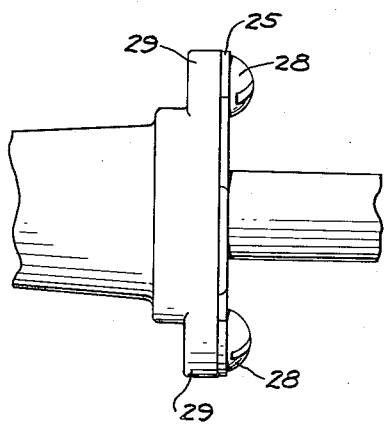
Fig. 10 is a top plan view of a valve body and its cap and stem.

There is a cap member attached to the valve body through which the valve stem extends. This cap, as shown in Fig. 2, may be formed of stamped metal having a body portion 25, a pair of extending ears 26 with elongated apertures 27 therein for receiving screws 28 which pass through the apertures and which are threaded into extending portions 29 of the body (Fig. 10). The cap is advantageously formed with two extending finger pieces 30 for purposes which will presently appear and a slot 31 adjacent one edge thereof. The cap is also formed with some indentations 32, there being three of such indentations shown.

The cap is formed, in a segment of its peripheral edge, with a downturned lip or flange 35 which projects into the hollow of the valve body as shown in Fig. 1. The cap has a central circular opening 36 through which the stem extends. The cap is formed with a piloting flange or rib 38 which fits within the body 1 and holds the cap accurately on its axis so that it may be rotatably adjusted. This flange 38 preferably has the same radius as the flange 35 so that these two elements provide a turning axis for the cap.

The lip or flange 35 provides a stop shoulder 37 positioned within the body and a second stop is provided by means of a pin 40 fitted tightly into a drilled recess in the material of the body as shown in Fig. 1. The pin may be press fitted in position. The pin 40 and the shoulder 37 provide limiting stops for the rotary movement of the valve 15.

Figure 6:
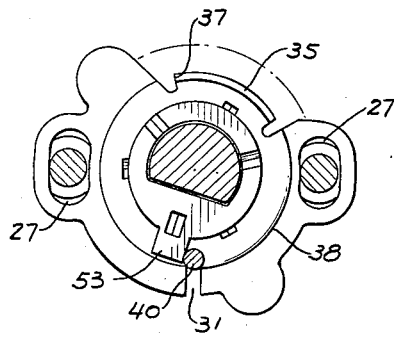
Fig. 6 is a sectional view taken substantially on line 6—6 of Fig. 1 illustrating a stop washer and the stop or limiting abutments therefor with the parts shown in "off" position.
Figure 7:
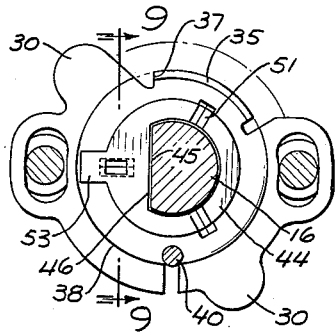
Fig. 7 is a sectional view similar to Fig. 6 showing the parts in full "on" position.
Figure 8:
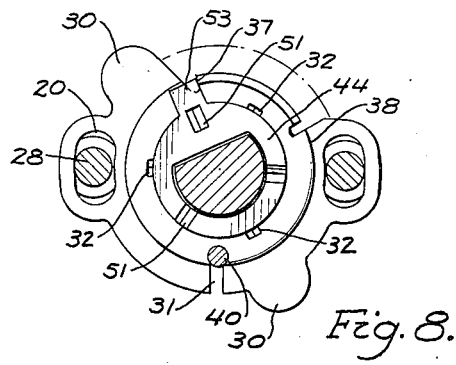
Fig. 8 is a sectional view similar to Figs. 6 and 7 showing the parts in simmer position.
Figure 9:
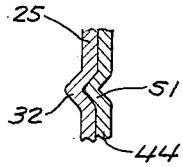
Fig. 9 is an enlarged cross sectional view taken on line 9—9 of Fig. 7 showing a detent arrangement.

Within the cap, as shown in Figs. 6, 7 and 8, is a washer 44 which is connected to rotate with the valve member. For this purpose, the stem has one flat side as at 45 thus forming substantially a D-shape section and the washer has a D-shaped opening therein which fits over the stem. This opening is illustrated at 46 and has some clearance with respect to the stem so that there is a limited amount of relative rotation between the washer and the stem. This washer is held against the inside face of the cap by a spring 50 positioned between the body 15 of the valve member and the washer, the spring thus holding the valve member on its seat. The washer also has indentations 51 formed therein corresponding to the indentations 32 in the cap, there being three of such indentations shown to correspond with the indentations in the cap. A projection or finger 53 is on the washer 44 and this finger lies between and functions between the stop pin 40 and the stop shoulder 37.

It will be seen from this construction that the cap may be secured to the body in a desired position of rotatable adjustment, depending upon the position of the elongated apertures 27 relative to the screws 28. This accordingly positions the shoulder 37 adjustably. In the normal "off" position where the ports are positioned as shown in Fig. 3, the finger 53 of the washer lies against the stop pin 40, as shown in Fig. 6. As the valve member is turned clockwise, as Fig. 3 is viewed, the washer turns with it and when the depressions 51 in the washer are about to register with the depression 32 in the cap, the relative angular faces of the depressions causes the washer, under the action of the spring 50, to partake of a snapping movement and the depressions 51 click into engagement with the depressions 32 in the cap. This is permitted because of the relative looseness of the washer 44 on the stem 16 and it creates an audible indication of the position of the valve. In this position, the port 19 registers with the inlet passage 5 and the valve is in full "on" position. As the valve member is further turned clockwise, from the Fig. 7 position, the finger 53 ultimately contacts the stop shoulder 37 and rotation is stopped. This is the simmer position and the ports may be positioned similar to that shown in Fig. 5.

It will be appreciated how, by adjustably positioning the cap, the simmer port position may be determined. In this way, the simmer port may be throttled, as desired, to thus vary the simmer flame from a relatively high position to a relatively low position. In making an original adjustment, for example, before the valve is installed in a range, the cap may be manipulated by the finger pieces 30 and when properly positioned the screws 28 may be tightly positioned. An adjustment may be made after the valve is installed in a range when the finger pieces 30 cannot be engaged. This is done by passing a tool, such as a screw driver, through the opening 23 of the sheet metal panelling and into the slot 31 and thereby rotatably adjusting the cap. Likewise the screws 28 may be loosened and then tightened by a screw driver passing through the opening 23 and engaging the screws. An advantageous procedure of making an adjustment is to loosen the cap, turn the valve to extreme low simmer position and then shift the cap counterclockwise as Figs. 6, 7 and 8 are viewed, in which action, the shoulder 37 engages the finger 53 and causes the valve member 15 to rock counterclockwise as Fig. 5 is viewed until the desired flame condition is obtained and then the screws may be tightened to set the cap in this position.

I claim:

1. A valve comprising, a ported valve body and a ported valve member which is turnable in the body for bringing the ports into and out of registry, a projecting operating stem for the valve member, means including a projection turnable with the valve member, a first limit stop substantially fixed relative to the body member, a cap through which the operating stem extends, said cap having a flange like part extending into the body member and constituting a second limit stop, said projection positioned between the limit stops, the first limit stop, when the projection abuts the same, positioning the valve member with the ports out of registry, the second limit stop, when the projection abuts the same, positioning the valve member with ports in substantial registry, and means for mounting the cap on the body member for rotary adjustment relative to the body member whereby the second limit stop may be adjustably positioned to control the registry of the ports when said projection abuts the second limit stop.

2. A valve comprising, a ported valve body and a ported valve member which is turnable in the body for bringing the ports into and out of registry, a projecting operating stem for the valve member, means including a projection turnable with the valve member, a pin set into the valve body and constituting a first limit stop, a cap through which the operating stem extends and which encloses the pin, said cap having a part formed to project into the body member and constituting a second limit stop, said projection positioned between the limit stops, the first limit stop, when the projection abuts the same, positioning the valve member with the ports out of registry, the second limit stop, when the projection abuts the same, positioning the valve member with the ports in registry, means including a screw with its head facing in the direction of extent of the operating stem for securing the cap to the valve body so that the cap may be rotatably adjusted relative to the valve body, whereby the second limit stop may be adjustably positioned to control the registry of the ports when said projection abuts the second limit stop.

ERVIN H. MUELLER.

REFERENCES CITED

The following references are of record in the file of this patent:

UNITED STATES PATENTS

| Number | Name | Date |
| --- | --- | --- |
| 912,717 | Murphy | Feb. 16, 1909 |
| 2,020,414 | Herbster | Nov. 12, 1935 |
| 2,030,150 | Mueller | Feb. 11, 1936 |

FOREIGN PATENTS

| Number | Country | Date |
| --- | --- | --- |
| 545,995 | Great Britain | June 23, 1942 |